United States Patent
Schon et al.

(10) Patent No.: US 9,840,002 B2
(45) Date of Patent: Dec. 12, 2017

(54) MODULAR DRIVER AND SCREW SYSTEM

(71) Applicants: Lew C. Schon, Baltimore, MD (US); John Rheinstein, New York, NY (US); Akash Ray, Congers, NY (US); David Shin, Bothell, WA (US)

(72) Inventors: Lew C. Schon, Baltimore, MD (US); John Rheinstein, New York, NY (US); Akash Ray, Congers, NY (US); David Shin, Bothell, WA (US)

( * ) Notice: Subject to any disclaimer, the term of this patent is extended or adjusted under 35 U.S.C. 154(b) by 362 days.

(21) Appl. No.: 14/500,947

(22) Filed: Sep. 29, 2014

(65) Prior Publication Data

US 2015/0089787 A1  Apr. 2, 2015

Related U.S. Application Data

(60) Provisional application No. 61/884,164, filed on Sep. 30, 2013.

(51) Int. Cl.

| | |
|---|---|
| *B25G 1/04* | (2006.01) |
| *B25B 15/00* | (2006.01) |
| *B25B 23/00* | (2006.01) |
| *B25B 23/10* | (2006.01) |
| *B25G 1/00* | (2006.01) |
| *F16B 23/00* | (2006.01) |

(52) U.S. Cl.
CPC ............ *B25G 1/043* (2013.01); *B25B 15/004* (2013.01); *B25B 15/008* (2013.01); *B25B 23/0007* (2013.01); *B25B 23/101* (2013.01); *B25G 1/005* (2013.01); *F16B 23/0084* (2013.01); *F16B 23/0092* (2013.01); *Y10T 29/49822* (2015.01)

(58) Field of Classification Search
CPC ...... B25G 1/043; B25G 1/005; B25B 15/008; B25B 23/0007; B25B 23/08–23/12; B25B 23/16; F16B 23/0084; F16B 23/0092; F16B 23/0053
See application file for complete search history.

(56) References Cited

U.S. PATENT DOCUMENTS

| | | | | |
|---|---|---|---|---|
| 2,082,748 A | * | 6/1937 | Brown ................ | F16B 23/0092 411/410 |
| 2,140,449 A | * | 12/1938 | Brown ................ | F16B 23/0007 411/410 |
| 2,173,707 A | * | 9/1939 | Brown ................ | F16B 23/0092 411/403 |

(Continued)

*Primary Examiner* — Christopher M Koehler
(74) *Attorney, Agent, or Firm* — Larry J. Guffey

(57) ABSTRACT

The combination of a driver and fastener that allows a user to insert and remove the fastener by applying larger than normal torque loads to it includes: (a) a fastener with a proximal end handle and a distal end head configured to provide a standard indentation and an additional recess that provides additional surface area that allows larger torque loads to be applied to the fastener, (b) a main driver with a shaft having a central bore, a handle at its proximal end and a head at its distal end configured to allow it to be temporarily inserted into the fastener's head, and (c) an awl driver having an awl shaft with an awl handle affixed to its distal end and its proximal end including a tip configured to allow it to pass through the main driver's bore and be brought into contact with the fastener's head where it is used to cut into the fastener cannula so as to temporarily adhere the awl driver to the fastener.

20 Claims, 3 Drawing Sheets

(56) References Cited

U.S. PATENT DOCUMENTS

| | | | | |
|---|---|---|---|---|
| 2,244,046 | A * | 6/1941 | Granville | A47G 3/00 411/403 |
| 2,400,684 | A * | 5/1946 | Clark | B25B 15/005 411/403 |
| 3,396,765 | A * | 8/1968 | Ridenour | B25B 13/06 411/404 |
| 3,452,373 | A * | 7/1969 | Vosbikian | B25B 13/06 7/138 |
| 4,206,794 | A * | 6/1980 | Reese | B25B 15/02 81/30 |
| 4,429,600 | A * | 2/1984 | Gulistan | B25B 13/486 81/441 |
| 4,539,874 | A * | 9/1985 | Jacovitz | B25B 23/10 411/403 |
| 4,963,144 | A * | 10/1990 | Huene | A61B 17/8625 606/104 |
| 5,358,368 | A * | 10/1994 | Conlan | F16B 23/0092 411/403 |
| 5,374,270 | A * | 12/1994 | McGuire | A61B 17/15 606/104 |
| 5,674,037 | A * | 10/1997 | Lu | F16B 23/0092 411/404 |
| 6,116,123 | A * | 9/2000 | Chen | B25B 15/02 81/177.2 |
| 6,361,258 | B1 * | 3/2002 | Heesch | F16B 23/0084 411/178 |
| 6,398,785 | B2 * | 6/2002 | Carchidi | A61B 17/8615 606/312 |
| 6,620,167 | B2 | 9/2003 | Deslauruers et al. | |
| 6,668,689 | B1 * | 12/2003 | Lai | B25B 13/5091 335/284 |
| 6,682,283 | B2 * | 1/2004 | Mann | F16B 23/0015 411/403 |
| D535,180 | S | 1/2007 | Tibbenham et al. | |
| 7,156,598 | B2 | 1/2007 | Tibbenham et al. | |
| D592,043 | S | 5/2009 | Suehiro | |
| D614,941 | S | 5/2010 | Murphy | |
| 9,044,843 | B1 * | 6/2015 | Mokhtee | B25B 15/004 |
| 2003/0059276 | A1 * | 3/2003 | Chen | F16B 23/0092 411/403 |
| 2005/0076751 | A1 * | 4/2005 | Panasik | F16B 23/0092 81/451 |
| 2006/0233626 | A1 * | 10/2006 | Lin | B25B 15/005 411/304 |
| 2006/0266168 | A1 * | 11/2006 | Pacheco, Jr. | B25B 13/065 81/460 |
| 2007/0227311 | A1 * | 10/2007 | Wang | B25B 13/06 81/125 |
| 2008/0234752 | A1 * | 9/2008 | Dahners | A61B 17/8047 606/291 |
| 2009/0220321 | A1 * | 9/2009 | Sakamura | F16B 23/0023 411/410 |
| 2010/0186556 | A1 * | 7/2010 | Lin | B25B 23/12 81/125 |
| 2010/0192736 | A1 * | 8/2010 | Burch | B25B 15/005 81/438 |
| 2013/0125714 | A1 * | 5/2013 | Dahners | A61B 17/8615 81/451 |

* cited by examiner

MODULAR DRIVER AND SCREW SYSTEM

CROSS-REFERENCE TO RELATED APPLICATION

This application claims the benefit of Provisional Patent Application No. 61/884,164, filed Sep. 30, 2013 by the present inventors. The teachings of this earlier application are incorporated herein by reference to the extent that they do not conflict with the teaching herein.

BACKGROUND OF THE INVENTION

1. Field of the Invention

The present invention relates generally to fasteners and their drivers. More particularly, the invention disclosed herein relates to a modular driver and screw system that allows one using them to insert and remove fasteners by applying larger than normal torque loads.

2. Description of the Related Art

Conventional screws may strip upon insertion or removal, limiting the amount of torque that can be applied and increasing the difficulty of inserting or removing a screw. For example, in orthopedic, craniomaxillofacial, dental, and other forms of surgery, stripped screws can cause safety issues, medical complications, and increased costs. In other fields, such as construction, stripping of screws may result in improper assembly or structural failure.

Many prior attempts have been made to develop new types of screws and drivers that minimize the problems associated with excessive torques being applied to screws and consequently stripping them or destroying their heads so that they no longer perform satisfactorily and/or difficult to remove, etc. See for example U.S. Pat. Nos. 5,358,368, 6,682,283, D614,941, D592,043, D535,180, 7,156,598, 4,539,874, 6,398,785 and 6,620,167.

Despite these prior inventions, there is still a need for improved screws and their drivers that will help alleviate the problems encountered with non-performing screws due to damaged heads or stripped threads and removal of incarcerated screws that may not be easily removed via other methods. It is an objective of the present invention to provide such improvements and to increase the maximum torque that can be applied to the screw during insertion and removal.

SUMMARY OF THE INVENTION

Recognizing the need for the development of new and improved fasteners and their drivers, the present invention is generally directed to providing an inventive set of fasteners or screws and their drivers that make it possible for one to increase the torque loads that can be applied to these new types of screws. This capability facilitates such a screw's insertion and extraction.

In a preferred embodiment, the present invention is the combination of a driver and a fastener that allows a user to insert and remove this fastener by applying larger than normal torque loads. It includes: (a) a fastener having a proximal end with a head configured to provide a standard indentation for engagement with a standard driver and an additional recess that provides additional surface area which can contact a complimentarily configured driver head so as to allow larger torque loads to be applied to the fastener, (b) a main driver having a driver shaft with a central bore that extends between its proximal and distal ends, wherein a handle is affixed to the shaft's proximal end and its distal end has a head configured to allow it to be temporarily be inserted into the fastener's head so that the main driver can be used to drive the cannulated fastener, and (c) an awl driver having an awl shaft with an awl handle affixed to its distal end and its proximal end and an awl tip at tis distal end that is configured to allow it to pass through the main driver's bore and be brought into contact with the fastener's head where it is used to cut into the fastener cannula so as to temporarily adhere the awl driver to the fastener in order to allow a user to apply larger than normal torque loads to the fastener.

In a variant to this embodiment, the awl driver's shaft is threaded to allow a lock nut to be situated on the awl shaft and rotated so as to cause the lock nut to move to a location on the awl shaft that helps in locking together the main and awl drivers.

In another variant to this embodiment, the exterior wall of the fastener's head is provided with reverse threads, and the main driver further includes a sleeve that has an interior surface with counter threads that allow these threads to be locked together so as to temporarily adhere the sleeve to the fastener and thereby allow a user to exert an axial force on the main driver to assist in removing the fastener from a location where it is attached to a body.

In yet another variant to this embodiment, the fastener has a central cannula that extends between its ends.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 3:
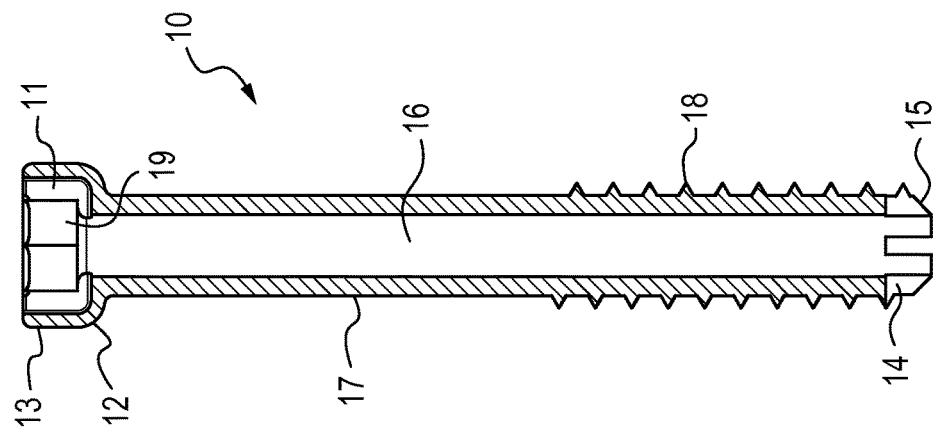
FIG. 3 is a cross-sectional view of the screw shown in FIG. 2.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The present invention generally relates to new and improved fasteners or screws and their drivers that were developed to facilitate this new screw's insertion and extraction. This was achieved by making it possible for one to increase the torque loads that can be applied to these new types of screws.

Since the screws and drivers of the present invention were designed for medical/surgical applications, they are usually discuss in this context in the present application. Thus, we sometimes speak herein of screws when we more precisely mean cannulated screws (e.g., those having a hollow shaft which allows a less intrusive guide wire to be used in surgically orienting and locating a cannulated screw in a bone).

Additionally, it should be noted that these improved screws and drivers can be used in a wide assortment of applications. Thus, our discussion of them herein in only a medical context should not be viewed as limiting in any way the wide applicability of the present invention.

Figure 1:
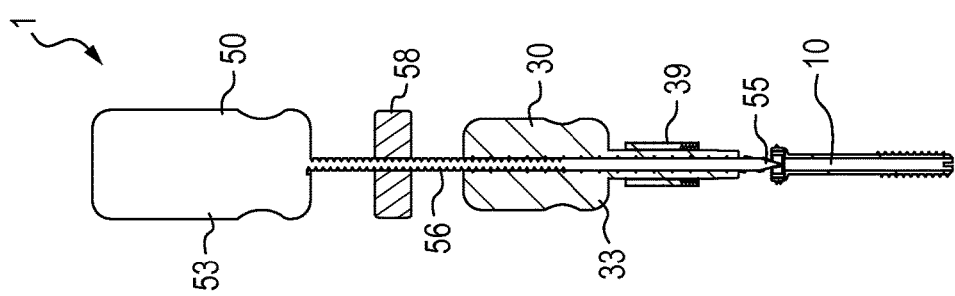
FIG. 1 is a cross-sectional view of a preferred embodiment of the present invention.

A preferred embodiment of the present invention 1 includes: a cannulated screw 10 that has a unique head configuration adapted to enable it to have larger than normal torque loads applied to it, a main driver 30 that has a unique head configuration that is complementary to that found on the cannulated screw that it is meant to drive and a hollow passageway on its centerline that allows the shaft of a secondary or awl driver to pass though it, and an awl driver 50 that has a tip configuration that is adapted to allow it to cut into the interior surface of the screw's cannula to gain purchase into the screw in order to allow a user to apply pulling force on a hard-to-remove screw. See FIG. 1.

A preferred embodiment for the cannulated screw or fastener 10 of the present invention is notable for adding singular or multiple recesses or notches 11 into its screw head 12 to allow for protuberances, which are geometrically complementary, extending from the main driver 30 to interface with the screw. See FIGS. 2-3. This screw has proximal 13 and distal 14 ends, a screw head 12 at its proximal end and a pointed screw tip 15 at its distal end 14. A cannula or hollow passageway 16 extends throughout the screw's shaft 17 that extends between it's ends. The exterior wall of the shaft is threaded or has threads 18.

The driver-screw interface of the present invention provides additional surface area and geometry compared to traditional systems, allowing the screw of the present invention to withstand greater applied torque before mechanical failure. This results in an increased resistance to thread stripping.

A notch round 11a is usually used to reduce stress concentrations on the screw. The notch bottom 11b will also usually be deeper than the standard head bottom to increase surface area for the notch side wall.

Figure 2:
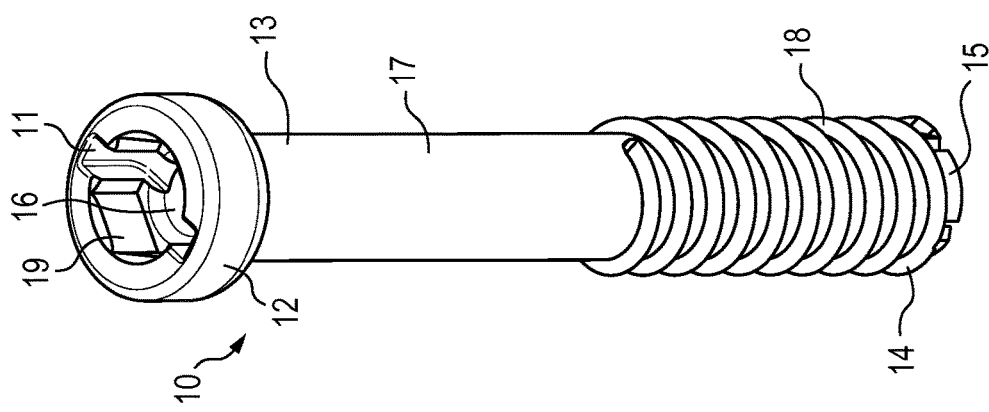
FIG. 2 is a perspective view of a preferred embodiment of the cannulated screw or fastener of the present invention

The screw head 12 also includes any one of multiple types of recesses 11 that have standard geometric features 19, for example—hex head indentation is shown in FIG. 2, that are compatible with standard driver tip configurations (e.g., slot, Philips, star, hexagonal, cruciate). This allows the user to use standard screwdrivers and to have back up geometry to interface with in case the standard or primary screw geometry becomes stripped.

Figure 4:
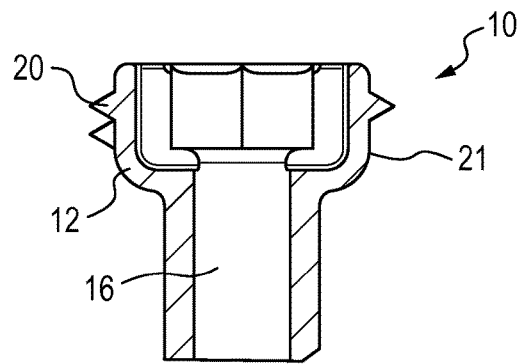
FIG. 4 is a cross-sectional view of the top of the head screw shown in FIG. 2 that has been modified to provide it with reverse threading on the exterior wall of the screw head.

An optional element of this screw is reverse threading or threads 20 on the exterior wall 21 of the screw head, to allow a driver to attach to this reverse threading on the head if the interior surface of the screw head is stripped. See FIG. 4. The new features of this screw also allow it to be held in place as a driver awl cuts into the screw to aid in extraction. These improvements are especially useful when the screw head, shaft, threads and/or driver are mechanically compromised.

Figure 5A:
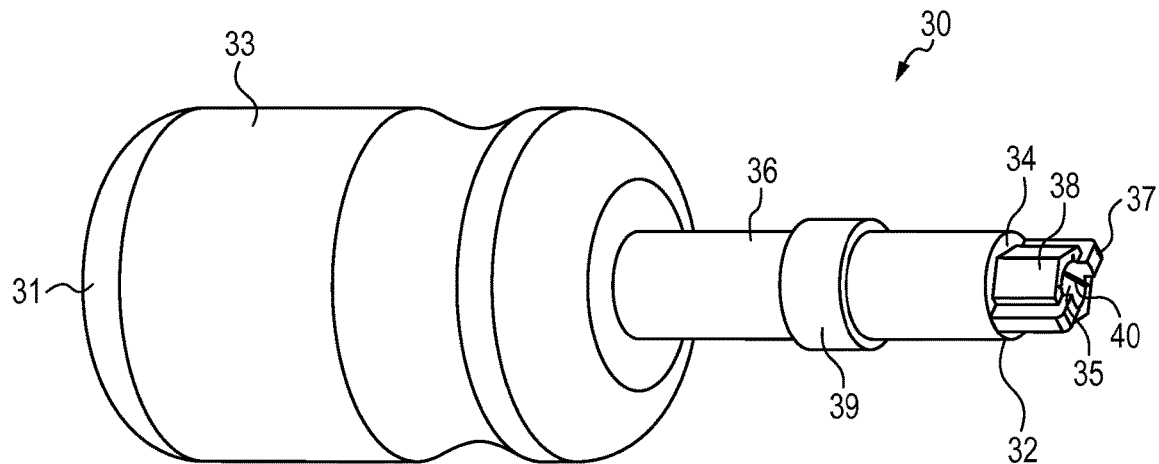
FIG. 5A is a perspective view of a preferred embodiment of the main driver in the present invention.
Figure 5B:
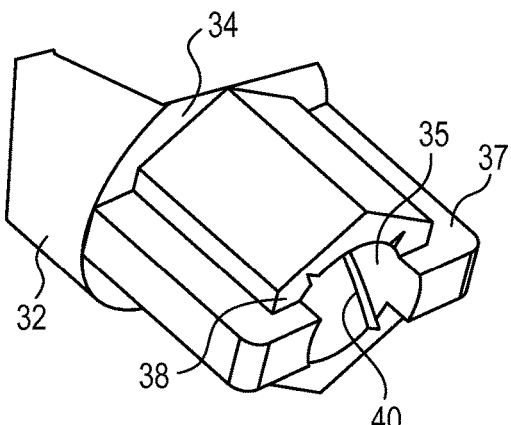
FIG. 5B is an enlarged, perspective view of the head of the main driver shown in FIG. 5A.

The main driver 30 of the present invention also has proximal 31 and distal 32 ends, a handle 33 at its proximal end and a driver head 34 at its distal end, an optional bore or hollow passage 35 extends between the main driver's ends, and a shaft 36 that extends between it's handle and driver head 34. See FIG. 5. Meanwhile, the driver head 34 has a configuration adapted to allow it to mate with one or more recesses 11 in the screw's head 12.

This main driver functions similarly to a standard screwdriver with the main difference being the inclusion of its unique head geometry. The optional central bore allows passage of a guide wire and/or an awl driver 50. An optional counter threaded sleeve 80 fits over the shaft 36 of the main driver. The main driver head 34 features protuberances 37 in addition to the standard head configuration 38 to mate with the recess geometry of the present invention's screw.

The perimeter or inside surface of the main driver's bore 35 will usually have inscribed on it awl thread guides 40 that are used to accommodate the larger diameter, reverse-oriented, cutting threads 58 on the awl's tip 55. If the bore was not so inscribed, the outer diameter of the main driver shaft would have to be larger than desired in order to provide with shaft with enough strength in its walls to allow it to exert the larger than normal torque loads. See FIG. 5B.

Figure 6:
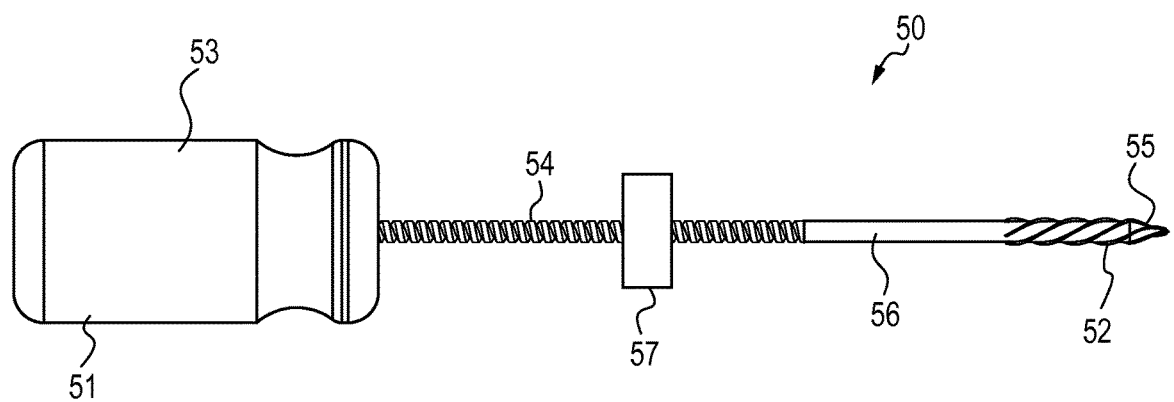
FIG. 6 is a front view of a preferred embodiment of the awl driver in the present invention.

The awl driver 50 of the present invention has proximal 51 and distal 52 ends, a handle 53 at its proximal end and awl threads 54 and an awl tip 55 at its distal end. An awl driver shaft 56 extends between its handle and awl threads 54. The exterior of this shaft has over much of its length threads 54 that allow a lock nut or other suitable locking mechanism 57 to be situated on the shaft and rotated or operated so as to cause it to climb up or down the shaft so that its location of the shaft can be set as desired by a user and therefore used to lock the two drivers together. See FIG. 6. Both the awl drive and main driver handle have a configuration that is adapted to allow a user to grip the drivers and apply torsional forces to them.

This driver's awl tip 55 has a configuration adapted to allow it to cut into the interior surface 22 of the screw cannula to gain purchase into the screw in order to increase the capacity for its removal. This feature allows a user to apply pulling force on the screw. In addition, the awl driver further distributes the forces applied to the screw and will increase the amount of torque that can be applied to it.

The main driver and awl driver can be made to engage the screw head concurrently via the locking nut 57 whose location on the awl driver's shaft can be set so that the locking nut is next to the top of the handle of the main driver so as to effectively temporarily lock the drivers together. The main driver and awl driver are twisted counterclockwise to remove the screw.

Figure 7:
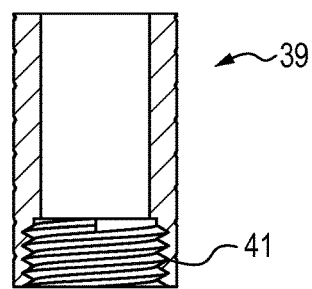
FIG. 7 is a cross-sectional view of a preferred embodiment of the optional sleeve that is part of the main driver of the present invention.

The main driver may also incorporate a sleeve 39 that includes counter threads 41 on the inside of the sleeve, see FIG. 7, to be threaded over the optional reverse threads 20, grove or other unique geometrical feature that is fabricated into the outer surface of the screw's head. This also allows torsional and pulling forces to be applied to aid in the extraction of the screw. An O-ring or other suitable mechanism will usually be used to affix the sleeve onto driver's shaft.

The present invention also gives its user the ability to remove screws with stripped threads on the screw shaft. The main driver 30 can hold the screw in place while the counter threaded sleeve 39 uses its counter threads 41 to engage the head or is the awl driver 50 cuts into the cannula or the sidewalls of the hollow shaft of a screw. This allows the screw to be gripped and removed using both torsional and pulling forces.

Elements of the present invention's main driver 30 are compatible with standard screws that have not been modified and the screw head design of the present invention is compatible with standard screwdrivers. Thus, while the present system is especially useful for removing incarcerated screws, it is also able to remove screws that are not incarcerated or damaged.

The present invention is an improvement over the standard screw and screwdriver due to the increases it can achieve in maximum applied torque and its resulting ability to remove incarcerated screws. The increased contact area between the screw and its drivers allows its user to apply larger torques before mechanical failures can arise in the screw.

When using the simplest configuration of the present invention, which consists of only the main driver 30, the screw-to-driver contact area is increased due to the protuberances on the main driver head 34. The awl driver and the main driver's reverse threaded sleeve also can increase the amount of contact between a screw and its drivers.

The drivers of the present invention allow a user to apply torque to a screw that has a stripped or damaged head, shaft, or threads. The main driver 30 has an optional, central bore that permits insertion of a guide wire or awl driver to aid in the extraction of a screw. The combination of the awl and the driver head's protuberance gives extra assurance that awl tip will not fail within the screw head due to force distribution between the awl and the protuberance, as well as co-linear alignment of the awl and screw cannula. The main driver's head can optionally be configured so that it can be removed and the main driver provided with a head that does not have the aforementioned protuberance so that this driver combination can be used on the non-modified screw heads of standard cannulated screws.

A major advantage of the present invention over the current technology is the ability to remove screws that have been damaged and are unable to be extracted using conventional screwdrivers. If the primary recess (e.g., hex) is stripped from over torquing or camming out with a corresponding driver, the secondary recess 11 (e.g., a slot) can be used with its corresponding driver head to remove the damaged screw.

In addition, screws with stripped threads can be removed using the awl driver 50 or sleeve 39 of the present invention. The main driver can hold the screw in place while either the awl driver tip 55 cuts into the screw cannula or the reverse threaded sleeve 39 engages the reverse or counter threads 20 on the outside of the screw head. When these components are properly situated and attached to the screw, a user applies an upward force to remove a damaged screw.

For screw insertion, the standard head and protrusions of the main driver fit into the head of the present invention's screw. The drive handle is held along its length so that the user can apply torsional force through the shaft onto the tip that is engaged into the corresponding recess in the screw head.

Though the preferred embodiment of the present invention includes a main driver with both primary (e.g. hex) and secondary head geometry, a standard screwdriver of either the primary or secondary shape can be used to insert or remove the modified screw at the cost of lowered protection against screw head failure. The recesses 11 in the screw head are structurally designed with reinforcement features to allow the additional torque without weakening the screw head or screw head shaft junction. The screw design may also incorporate rounds, bevels, and other design features to increase ease of manufacturing/assembly as well as to reduce stress concentrations to allow for the application of greater forces on the components of the present invention.

Regarding fabrication of the present invention, it should be noted that some or all of the key elements (e.g., screw: cannula, notch, notch round, head threads, outer head geometry; main driver: cannula, main protuberance, awl guides, sleeve, reverse threads, socket geometry, sleeve grips; locking mechanism/nut; awl driver and its locking threads) of the present invention may or may not be included in its preferred embodiments. It can also be noted that these embodiments do not require any fundamental changes in the typical manufacturing process that is currently used by industry.

The typical manufacturing process for screws involves cutting sections of wire and then punching one end with a die to form the head shape. The screw is then annealed and the threads are formed with a thread roller. The screws are then hardened through heat treatment. The only change required is the die that forms the head. Replacing this die with one that contains a mold for the design of the present invention would be the only necessary change in the manufacturing process. The reverse threading can also be cut into the screw head if so desired.

Manufacturing the other components of the present invention would not require any special methods. The awl driver can be made in the same way every awl is made, except that it shaft is threaded to permit its lock nut to lock the awl to the main driver. The main driver's modifications are its central bore and the protrusions on its head. A solid cylinder of material is drilled through to form the central bore and the distal end is broached to provide it with the correct geometry (hex, cruciate, star, etc.).

Multiple configurations or variants of the present invention are possible. A solid configuration of the drivers without the awl, sleeve, or cannulated components can be used to remove the screw. Another configuration involves a cannulated driver with the awl component inserted through the cannula of the driver. The two are locked together and the main/awl driver complex engages the screw in unison to apply torque and remove the screw. A third configuration uses the reverse threaded sleeve together with the main driver. A fourth configuration involves the use of a non-cannulated screw. Finally, the main driver, the awl driver and the sleeve can be used together at the same time to insert or remove screws.

Many locking screw systems can be improved through inclusion of one or more novel aspects of the present invention, e.g., due to the ability of the present invention to increase increased screw torque compared to conventional screwdrivers. Locking plates that accommodate varying screws require the screws to cut into hardware. Therefore, relatively soft metals must be used to manufacture the plates so the screws are able to cut into the material. Using the present invention, plates and hardware can be made from harder metals because of the increased torque limit. Harder metals create a better lock between the screw and plate.

The present invention can also be applied to screw systems already in existence through retrofitting techniques. The existing screwdrivers and screws can be modified. This can be done on the spot either pre operatively or intra operatively using conventional cutting or milling tools or incorporating some of the novel aspects of the present invention into existing screw types at the point of service.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereafter set forth in the claims to the invention.

We claim:

1. The combination of a driver and a fastener that allows a user to insert and extract said fastener, even when the head of said fastener has been stripped, said combination comprising:
    a fastener having distal and proximal ends and a centerline that extends between said ends, wherein said fastener proximal end having a head with a configuration adapted to provide a standard, recess indentation for temporary engagement with a standard driver head and an additional recess that provides additional surface area which can contact a driver head so as to allow a greater torque to be applied to said fastener,
    a main driver having a driver shaft with distal and proximal ends and a central bore that extends between said ends and surrounds the centerline of said shaft, wherein said shaft proximal end having affixed thereto a driver handle that has a configuration adapted to provide a user with more leverage in rotating said shaft about said centerline, said shaft distal end having a head that has a configuration adapted to allow said head to temporarily be inserted into said fastener standard, recess indentation and additional recess in order for a user to rotate said main driver about said centerline to drive or extract said fastener, and
    an awl driver having an awl shaft with distal and proximal ends and a awl centerline that extends between said ends, wherein said awl shaft proximal end having affixed thereto an awl handle that has a configuration adapted to provide a user with more leverage in rotating said awl shaft about said awl centerline, said awl shaft distal end having a tip that has a configuration adapted to allow said tip to pass through said main driver bore and be brought into temporary contact with said fastener so as to cut into said fastener so as to temporarily lock said awl driver to said fastener in order to allow said awl driver to be used to assist in extracting said fastener.

2. The combination of a driver and a fastener as recited in claim 1, wherein:
    said awl shaft having an exterior surface that has threads,
    said awl driver further including a lock nut that has a configuration adapted to allow said lock nut to be situated on said awl shaft and rotated so as to cause said lock nut to move on said awl shaft so that said lock nut can be located on said awl shaft at a location that places said lock nut proximate the handle of said main driver and lock said awl driver and main driver together so that they may be rotated in unison to extract said fastener.

3. The combination of a driver and a fastener as recited in claim 2, wherein:
    said fastener head having an exterior wall that includes reverse threads,
    said main driver further including a sleeve that has an interior surface that includes counter threads that have a configuration adapted to allow said counter threads to be threaded onto said reverse threads of said fastener head so as to temporarily lock said sleeve to said fastener for the purpose of allowing a user to exert an axial force on said main driver to assist in extracting said fastener from an attached location within a body.

4. The combination of a driver and a fastener as recited in claim 3, wherein:
    said fastener further having a central cannula with an outer surface that extends between said ends,
    said awl driver tip further configured to fit within said central cannula of said fastener and to cut into said outer surface of said cannula so as to temporarily lock said awl driver to said fastener in order to allow said awl driver to be used to assist in extracting said fastener.

5. The combination of a driver and a fastener as recited in claim 4, further comprising:
    an awl thread guide that is inscribed into said main driver shaft central bore and wherein said awl thread guide having a configuration adapted to aid said tip of said awl driver in passing through said main driver shaft central bore without having to increase the diameter of said main driver shaft central bore to allow the passage of said tip of said awl driver through said main driver shaft central bore.

6. The combination of a driver and a fastener as recited in claim 2, wherein:
    said fastener further having a central cannula with an outer surface that extends between said ends,
    said awl driver tip further configured to fit within said central cannula of said fastener and to cut into said outer surface of said cannula so as to temporarily lock said awl driver to said fastener in order to allow said awl driver to be used to assist in extracting said fastener.

7. The combination of a driver and a fastener as recited in claim 1, wherein:
    said fastener head having an exterior wall that includes reverse threads,
    said main driver further including a sleeve that has an interior surface that includes counter threads that have a configuration adapted to allow said counter threads to be threaded onto said reverse threads of said fastener head so as to temporarily lock said sleeve to said fastener for the purpose of allowing a user to exert an axial force on said main driver to assist in extracting said fastener from an attached location within a body.

8. The combination of a driver and a fastener as recited in claim 7, wherein:
    said fastener further having a central cannula with an outer surface that extends between said ends,
    said awl driver tip further configured to fit within said central cannula of said fastener and to cut into said outer surface of said cannula so as to temporarily lock said awl driver to said fastener in order to allow said awl driver to be used to assist in extracting said fastener.

9. The combination of a driver and a fastener as recited in claim 1, wherein:
    said fastener further having a central cannula with an outer surface that extends between said ends,
    said awl driver tip further configured to fit within said central cannula of said fastener and to cut into said outer surface of said cannula so as to temporarily lock said awl driver to said fastener in order to allow said awl driver to be used to assist in extracting said fastener.

10. The combination of a driver and a fastener as recited in claim 1, further comprising:

an awl thread guide that is inscribed into said main driver shaft central bore and wherein said awl thread guide having a configuration adapted to aid said tip of said awl driver in passing through said main driver shaft central bore without having to increase the diameter of said main driver shaft central bore to allow the passage of said tip of said awl driver through said main driver shaft central bore.

11. A method for inserting and extracting a fastener, even when the head of said fastener has been stripped, said method comprising the steps of:
utilizing the combination of a driver and a fastener that includes:
a fastener having distal and proximal ends and a centerline that extends between said ends, wherein said fastener proximal end having a head with a configuration adapted to provide a standard, recess indentation for temporary engagement with a standard driver head and an additional recess that provides additional surface area which can contact a driver head so as to allow a greater torque to be applied to said fastener,
a main driver having a driver shaft with distal and proximal ends and a central bore that extends between said ends and surrounds the centerline of said shaft, wherein said shaft proximal end having affixed thereto a driver handle that has a configuration adapted to provide a user with more leverage in rotating said shaft about said centerline, said shaft distal end having a head that has a configuration adapted to allow said head to temporarily be inserted into said fastener standard, recess indentation and additional recess in order for a user to rotate said main driver about said centerline to drive or extract said fastener, and
an awl driver having an awl shaft with distal and proximal ends and a awl centerline that extends between said ends, wherein said awl shaft proximal end having affixed thereto an awl handle that has a configuration adapted to provide a user with more leverage in rotating said awl shaft about said awl centerline, said awl shaft distal end having a tip that has a configuration adapted to allow said tip to pass through said main driver bore and be brought into temporary contact with said fastener so as to cut into said fastener so as to temporarily lock said awl driver to said fastener in order to allow said awl driver to be used to assist in extracting said fastener.

12. The method as recited in claim 11, wherein:
said awl shaft having an exterior surface that has threads,
said awl driver further including a lock nut that has a configuration adapted to allow said lock nut to be situated on said awl shaft and rotated so as to cause said lock nut to move on said awl shaft so that said lock nut can be located on said awl shaft at a location that places said lock nut proximate the handle of said main driver and lock said awl driver and main driver together so that they may be rotated in unison to extract said fastener.

13. The method as recited in claim 12, wherein:
said fastener head having an exterior wall that includes reverse threads,
said main driver further including a sleeve that has an interior surface that includes counter threads that have a configuration adapted to allow said counter threads to be threaded onto said reverse threads of said fastener head so as to temporarily lock said sleeve to said fastener for the purpose of allowing a user to exert an axial force on said main driver to assist in extracting said fastener from an attached location within a body.

14. The method as recited in claim 13, wherein:
said fastener further having a central cannula with an outer surface that extends between said ends,
said awl driver tip further configured to fit within said central cannula of said fastener and to cut into said outer surface of said cannula so as to temporarily lock said awl driver to said fastener in order to allow said awl driver to be used to assist in extracting said fastener.

15. The method as recited in claim 14, wherein said main driver further comprising:
an awl thread guide that is inscribed into said main driver shaft central bore and wherein said awl thread guide having a configuration adapted to aid said tip of said awl driver in passing through said main driver shaft central bore without having to increase the diameter of said main driver shaft central bore to allow the passage of said tip of said awl driver through said main driver shaft central bore.

16. The method as recited in claim 12, wherein:
said fastener further having a central cannula with an outer surface that extends between said ends,
said awl driver tip further configured to fit within said central cannula of said fastener and to cut into said outer surface of said cannula so as to temporarily lock said awl driver to said fastener in order to allow said awl driver to be used to assist in extracting said fastener.

17. The method as recited in claim 11, wherein:
said fastener head having an exterior wall that includes reverse threads,
said main driver further including a sleeve that has an interior surface that includes counter threads that have a configuration adapted to allow said counter threads to be threaded onto said reverse threads of said fastener head so as to temporarily lock said sleeve to said fastener for the purpose of allowing a user to exert an axial force on said main driver to assist in extracting said fastener from an attached location within a body.

18. The method as recited in claim 17, wherein:
said fastener further having a central cannula with an outer surface that extends between said ends,
said awl driver tip further configured to fit within said central cannula of said fastener and to cut into said outer surface of said cannula so as to temporarily lock said awl driver to said fastener in order to allow said awl driver to be used to assist in extracting said fastener.

19. The method as recited in claim 11, wherein:
said fastener further having a central cannula with an outer surface that extends between said ends,
said awl driver tip further configured to fit within said central cannula of said fastener and to cut into said outer surface of said cannula so as to temporarily lock said awl driver to said fastener in order to allow said awl driver to be used to assist in extracting said fastener.

20. The method as recited in claim 11, wherein said main driver further comprising:
an awl thread guide that is inscribed into said main driver shaft central bore and wherein said awl thread guide having a configuration adapted to aid said tip of said awl driver in passing through said main driver shaft central bore without having to increase the diameter of said main driver shaft central bore to allow the passage of said tip of said awl driver through said main driver shaft central bore.

\* \* \* \* \*